US009225846B2

(12) United States Patent
Chan et al.

(10) Patent No.: US 9,225,846 B2
(45) Date of Patent: Dec. 29, 2015

(54) METHOD FOR ACTIVATING A SIM CARD AND OBTAINING BALANCE IN REAL-TIME

(71) Applicant: Color-I Holdings Limited, Kowloon (HK)

(72) Inventors: Kam Cheong Chan, Kowloon (HK); Tak Kit Leung, Kowloon (HK)

(73) Assignee: COLOR-I HOLDINGS LIMITED, Hong Kong (HK)

( * ) Notice: Subject to any disclaimer, the term of this patent is extended or adjusted under 35 U.S.C. 154(b) by 0 days.

(21) Appl. No.: 14/459,170

(22) Filed: Aug. 13, 2014

(65) Prior Publication Data

US 2015/0350456 A1    Dec. 3, 2015

(30) Foreign Application Priority Data

May 29, 2014   (HK) .................................. 14105088.6

(51) Int. Cl.
| | | |
|---|---|---|
| H04M 11/00 | (2006.01) | |
| H04M 15/00 | (2006.01) | |
| H04B 1/3818 | (2015.01) | |
| H04W 4/24 | (2009.01) | |

(52) U.S. Cl.
CPC ........... *H04M 15/715* (2013.01); *H04B 1/3818* (2015.01); *H04W 4/24* (2013.01)

(58) Field of Classification Search
CPC .............................. H04W 4/24; H04M 15/715
See application file for complete search history.

(56) References Cited

U.S. PATENT DOCUMENTS

| | | | |
|---|---|---|---|
| 8,565,720 B1* | 10/2013 | Gailloux et al. ............... | 455/406 |
| 2003/0147363 A1* | 8/2003 | Ala-Luukko ................ | 370/328 |
| 2005/0250537 A1* | 11/2005 | Narea ............................ | 455/558 |
| 2007/0254629 A1* | 11/2007 | Black et al. ................... | 455/406 |
| 2008/0039050 A1* | 2/2008 | Black et al. ................... | 455/406 |
| 2010/0130254 A1* | 5/2010 | Kamada et al. ............... | 455/558 |
| 2011/0066985 A1* | 3/2011 | Corbin et al. ................. | 715/863 |
| 2014/0024361 A1* | 1/2014 | Poon et al. .................... | 455/419 |
| 2015/0148020 A1* | 5/2015 | Laden et al. .................. | 455/418 |
| 2015/0181411 A1* | 6/2015 | Kim .............................. | 455/558 |

* cited by examiner

*Primary Examiner* — Kenneth Lam
(74) *Attorney, Agent, or Firm* — SoCal IP Law Group LLP; Steven C. Sereboff; M. Kala Sarvaiya

(57) ABSTRACT

A method for activating a SIM card and obtaining balance in real-time, comprising the following steps: the user obtains a SIM card and inserts the SIM card in a mobile communication device; after starting the device, it interface automatically displays the prompting message for registration and activation, and the user completes the registration and activates the SIM card. In the meantime, a preset application program is installed on the SIM card mobile communication device, and the user forms operating record by starting the preset application program. After receiving the operating record, a remote server matches the balance to be obtained and sends the instruction to the telecommunication provider. The docking server firstly verifies the identity validity of service provider, then adjusts the balance of SIM card in real-time and feeds back the balance to the remote server and the remote server feeds back the balance to the user.

8 Claims, 2 Drawing Sheets

METHOD FOR ACTIVATING A SIM CARD AND OBTAINING BALANCE IN REAL-TIME

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims the benefit of priority to Hong Kong Patent Application No. 14105088.6, filed May 29, 2014, of which full contents are incorporated herein by reference.

FIELD OF THE INVENTION

The present invention relates to a communication service technology, in particular relates to a method for activating a SIM card and obtaining balance in real time.

BACKGROUND OF THE INVENTION

At present, with the progressive development of transportation industry, travelling abroad for business has become popular and traveling abroad has become a choice of many families for taking holiday and leisure. However, different countries have different communication service modes, thus the SIM cards from original countries may not be used in the other countries. In order to communicate with others, these users must use SIM cards provided by local provider. These SIM cards may be purchased by the users, while some countries or regions will distribute free pre-stored value SIM card to foreign travelers when aboard.

At present, before obtaining the pre-stored balance in a SIM card, it is necessary to activate such SIM card first. Generally, for activation of a SIM card, the user is required directly to dial up to the customer service hotline of telecommunication provider and activate the SIM card according to the instruction. However, such activation mode often brings out a lot of problems, such as language barrier and difficulty in operation. In addition, to obtain the balance on SIM card, it is general practice to store the balance to a limit and then automatically increase, thus leading to a problem of time delay and cause inconveniences. On the other hand, when the visitors just arrive in a country or region, it is usually difficult for them to obtain the instant information of peripheral stores or scenic spots, so that they have to ask for materials from local scenic spot service center or use mobile device to search for relevant information. This method is relatively inconvenient.

In view of abovementioned background, a method for activating SIM card with simple requirements and procedures for user, and also can obtain balance and the peripheral information in simple method, will play important role.

CONTENT OF THE INVENTION

In order to overcome present technical limitation, the present invention is to provide a method for activating the SIM card and obtaining balance in real-time, so as to address the inconveniences in activating SIM card and obtaining balance. In addition, this method provides users with greater conveniences by actively sending the peripheral related recommended information to them.

In order to achieve the abovementioned objectives, the present invention will apply the following technical solutions:

A method for activating a SIM card and obtaining balance in real-time, including a mobile communication device and a SIM card inserted in the mobile communication device, wherein the method also comprises the following steps:

Step 1, the user starts the mobile communication device, and the SIM card displays the prompting message on registration activation through the operation interface of the mobile communication device; the user fills in the registration information according to the prompt, the registration information is sent to the remote server of service provider, and then the SIM card is activated. In the meantime, the SIM card is automatically installing several preset application programs on the mobile communication device;

Furthermore, the specific realization process of the step 1 is described as follows:

Step 1.1 After the user has turned on mobile communication device, the SIM card is also activated. At this moment, the SIM card firstly makes self-inspection to verify whether the SIM card has been activated; if yes, the SIM card is directly connected with the mobile communication device; Otherwise, the SIM card displays the prompting message of registration activation on the operation interface of the mobile communication device.

Step 1.2 The user inputs registration information such as registered account name, basic information and preset password according to prompt and makes validation;

Step 1.3 Such registration information as registered account name, basic information and preset password are sent to the remote server of the service provider. After the remote server has received these information, the SIM card is then activated. In the meantime, the SIM card is automatically installing several preset application programs on the mobile communication device.

It is noted that after the SIM card has been activated, the SIM card will automatically display the information preset by the service provider through the operation interface of the mobile communication device.

It is further noted that after the SIM card has been successfully activated and the user has unlocked the screen of the mobile communication device, the information is automatically displayed through the operation interface of the mobile communication device.

It is further noted that a method for activating a SIM card and obtaining balance in real-time, characterized in that, after the SIM card has been activated, the SIM card will provide the game preset by the service provider through the operation interface of the mobile communication device.

It is further noted that, the information can also be displayed in another mode, namely, after SIM card has been successfully activated and before the screen of the mobile communication device is unlocked by the user, the information is automatically displayed through the operation interface of the mobile communication device.

The user can select to slide the information interface upwards or downwards or click the close icon on the information interface to remove the information, or select to wait for automatic removal after the information has been completely displayed.

Step 2 The user forms an operation record by clicking any said preset application program, and the operation record is automatically sending to the remote server. After having received the operation record, the remote server automatically matches the information on the due balance of the SIM card and sends the instruction on obtaining balance to the docking server of telecommunication provider. The due balance of the SIM card includes the call duration and the available data usage.

Step 3 After having received the instruction on obtaining balance, the docking server firstly automatically verifies the identity of the service provider according to the database of service provider. When the verification result shows that the identity of the service provider is valid, the docking server will adjust the balance of the corresponding SIM card in real-time manner, and sends the information on the existing balance of the SIM card to the remote server of service provider.

Step 4 The remote server receives the information on existing balance and revert it to the user. The specific realization process is described as follows:

Step 4.1 After having received the information on existing balance from the docking server, the remote server upload the information on existing balance to network;

Step 4.2 The user views the preset application program and log on the registration account, so as to view the information on existing balance of the SIM card.

It is noted that the SIM card is used in combination with the positioning settings of the mobile communication device (such as the global positioning system, the real-time IP address, the latest received signals and the near-by transmission device) to obtain the user location information and send the user location information to the remote server. After having received the user location information, the remote server will use the user location information in combination with the basic information filled by the user during registration and activation of the SIM card in order to match and provide all kinds of real-time information in the user's periphery from the preset information database for the user, such as scenic spot information, merchant information and traffic information.

The beneficial effects of the present invention consist in that the method for activating SIM card is more convenient and can be well popular; On the other hand, the user can even easily and quickly obtain the call duration and available data usage in real-time manner. In addition, the user can use the preset application programs to obtain the location related peripheral information pushed by the service provider. This is particular convenient for the travelers who visit a country or region for work or tourist in the first time.

DESCRIPTION OF ATTACHED DRAWINGS

DETAILED DESCRIPTION OF PREFERRED EMBODIMENTS

The present invention will be further described in combination with the attached drawings. It is noted, the present invention is implemented based on the precondition of this technical solution, but is not merely limited to this embodiment.

Figure 1:
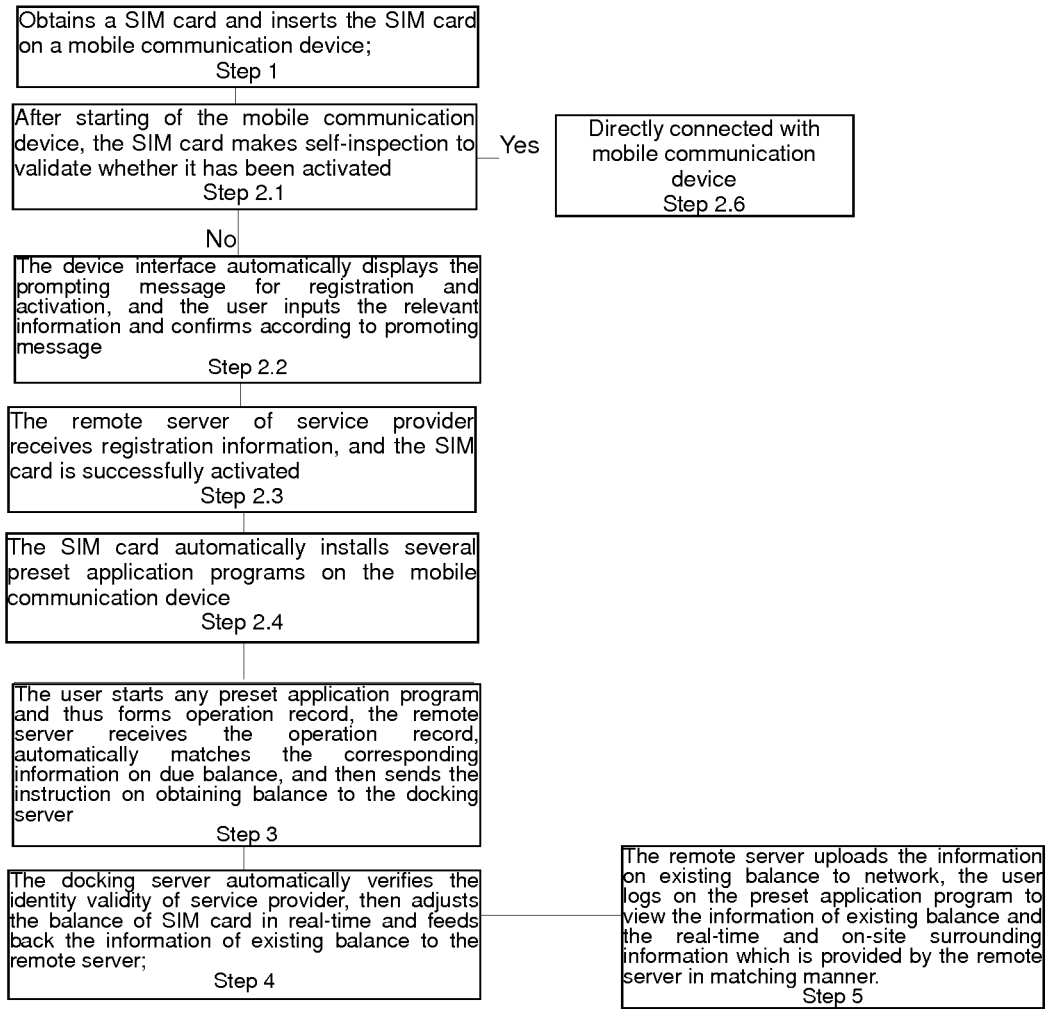
FIG. 1 is the implementation flow diagram of the present invention.

As shown in FIG. 1, a method for activating SIM card and obtaining balance in real-time, comprising the following steps:

Step 1 After having obtained the SIM card, the user inserts the SIM card to the mobile communication device;

Step 2, the user starts the mobile communication device, and the SIM card displays the prompting message on registration activation through the operation interface of the mobile communication device; the user completes the registration and activates the SIM card according to the interface prompt. In the meantime, the SIM card is automatically installing several preset application programs on the mobile communication device.

Further, the specific realization process of the step 2 is described as follows:

Step 2.1. After the user has turned on the mobile communication device, the SIM card is also started. At this moment, the SIM card firstly makes self-inspection to verify whether the SIM card has been activated. If yes, then at step 2.6, the SIM card is directly connected with the mobile communication device. Otherwise, the process proceeds to step 2.2, and the SIM card displays the prompting message of registration activation on the operation interface of the mobile communication device.

Also at step 2.2, the user inputs such registration information as registered account name, basic information and preset password according to prompt and makes validation.

Step 2.3 Such registration information as registered account name, basic information and preset password have been sent to the remote server of the service provider, after the remote server has received information, the SIM card is activated. In the meantime, at step 2.4, the SIM card will automatically install several preset application programs on the mobile communication device.

Figure 2:
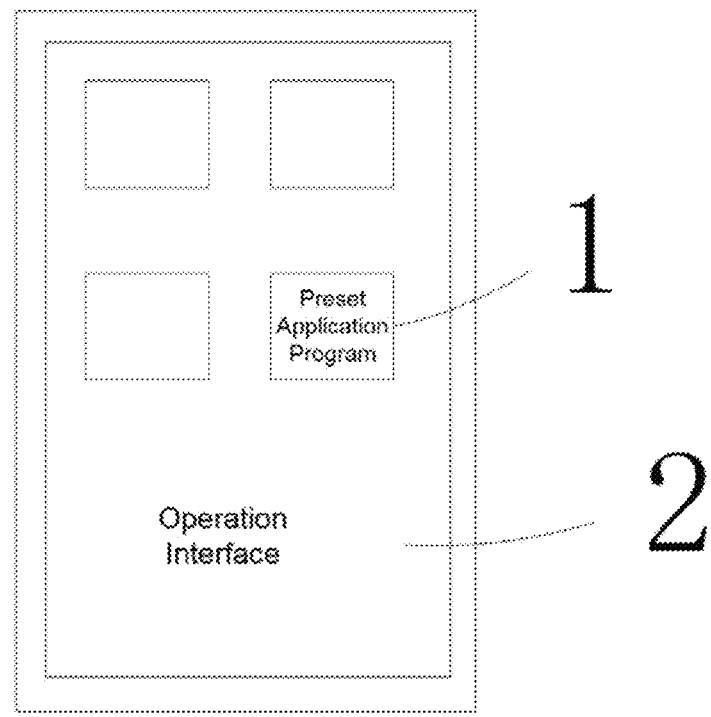
FIG. 2 is the schematic diagram of the operation interface of mobile communication device after SIM card has been successfully activated.

Step 3 As shown in FIG. 2, the user forms operation record by clicking the preset application program 1 through the operation interface 2 of the mobile device, and the operation record will be automatically sent to the remote server of service provider. After having received the operation record, the remote server automatically matches the information on the due balance of the SIM card and sends the instruction on obtaining balance to the docking server of telecommunication provider. The due balance of the SIM card includes the call duration and the available data usage.

After having been activated, the SIM card will automatically display the information preset by the service provider through the operation interface 2 of the mobile communication device. After the SIM card has been successfully activated and the user has unlocked the screen of the mobile communication device, the information is automatically displayed through the operation interface 2 of the mobile communication device. The information can also be displayed in another mode, namely, after SIM card has been successfully activated and before the screen of the mobile communication device has been unlocked by user, the information is automatically played through the operation interface of the mobile communication device. The user can select to slide the information interface upwards or downwards or click the close icon on the information interface to remove the information, or select to wait for automatic removal after the information has been completely displayed.

Step 4 After having received the instruction on obtaining balance, the docking server firstly automatically verifies the identity of the service provider according to the database of service provider. When the verification result shows that the identity of the service provider is valid, the docking server will adjust the balance of the corresponding SIM card in real-time manner, and sends the information on the existing balance of the SIM card to the remote server of service provider.

Step 5 The remote server receives the information on existing balance and revert it to the user.

Further, the specific realization process of the step 5 is described as follows:

Step 5.1 After having received the information on existing balance from the docking server, the remote server uploads the information on existing balance to network.

Step 5.2 the user views the preset application program and log on the registration account, so as to view the information on existing balance of the SIM card.

Figure 3:
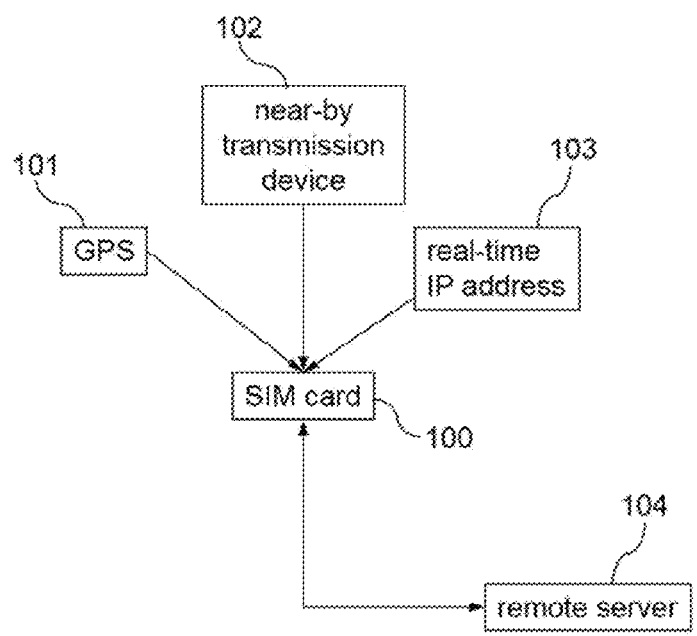
FIG. 3 is the schematic diagram of the remote server which has received the user location information sent by the SIM card and then sends related peripheral information to the user.

As shown in FIG. 3, when the user opens and logs on the preset application program, the SIM card 100 is used in combination with the positioning settings of the mobile communication device (such as global positioning system 101, the near-by transmission device 102 and the real-time IP address 103) to obtain the user location information and send the user location information to the remote server 104. After having received the user location information, the remote server 104 will use the user location information in combination with the basic information filled by the user in registering and activating the SIM card to match and provide all kinds of real-time information in the user's periphery from the preset information database for the user, such as scenic spot information, merchant information and traffic information.

Those skilled in the art may make the other corresponding changes and transformations according to said technical solution and conception, while all these changes and transformations will fall within the claims of the present invention.

It is claimed:

1. A method for activating a subscriber identity module (SIM) card and obtaining balance in real-time, including a mobile communication device and a SIM card inserted in the mobile communication device, the method comprises the following steps:

Step 1, a user starts the mobile communication device, and a SIM card displays a prompting message on registration activation through an operation interface of the mobile communication device; the user fills in registration information according to the prompt, the registration information is sent to a remote server of service provider, and the SIM card is activated; in the meantime, the SIM card is automatically installing several preset application programs on the mobile communication device;

Step 2, the user forms an operation record by starting any said preset application program, the operation record is be automatically sending to the remote server; after having received the operation record, the remote server automatically matches information on a due balance of the SIM card and sends an instruction on obtaining balance to a docking server of telecommunication provider;

Step 3, after having received the instruction on obtaining balance, the docking server firstly automatically verifies an identity of the service provider according to a database of the service provider; when a verification result shows that the identity of the service provider is valid, the docking server will adjust a balance of the corresponding SIM card in real-time manner, and sends information on the existing balance of the SIM card to the remote server;

Step 4, the remote server receives the information on existing balance and feeds back the balance to the user.

2. The method according to claim 1, characterized in that, the specific realization process of the step 1 is described as follows:

Step 1.1, after the user has started the mobile communication device, the SIM card is also started; at this moment, the SIM card firstly makes self-inspection to verify whether the SIM card has been activated; if yes, the SIM card is directly connected with the mobile communication device; if no, the SIM card displays the prompting message of registration activation on the operation interface of the mobile communication device;

Step 1.2, the user inputs such registration information as registered user account name, basic information and preset password according to prompt and makes validation;

Step 1.3 such registration information as registered user account name, basic information and preset password are sent to the remote server of the service provider; after the remote server has received information, the SIM card is then activated; in the meantime, the SIM card is automatically installing several preset application programs on the mobile communication device.

3. The method according to claim 1, wherein after the SIM card has been activated, the SIM card is automatically showing information preset by the service provider through the operation interface of the mobile communication device.

4. The method according to claim 3, wherein after the SIM card has been successfully activated and the user has unlocked a screen of the mobile communication device, the information preset by the service provider is automatically displayed through the operation interface of the mobile communication device.

5. The method according to claim 3, wherein after the SIM card has been successfully activated and before the user has unlocked the screen of the mobile communication device, the information preset by the service provider is automatically displayed through the operation interface of the mobile communication device.

6. The method according to claim 1, wherein after the SIM card has been activated, the SIM card will provide a game preset by the service provider through the operation interface of the mobile communication device.

7. A method according to claim 6, wherein the SIM card is used in combination with one or more positioning settings of the mobile communication device to transmit to the remote server; after having received information of user position, the remote server will use the information of user location in combination with basic information filled by the user in registering and activating the SIM card to provide the user with real-time information in a periphery of the user from a preset information database through the preset application program interface.

8. The method according to claim 1, wherein the specific realization process of the step 4 is described as follows:

Step 4.1: after having received the information on existing balance from the docking server, the remote server uploads the information on existing balance to a network;

Step 4.2, the user starts the preset application program and logs on a registration account used to activate the SIM card, so as to view a message of existing balance of the SIM card.

* * * * *